T. CARROLL.
MOTION TRANSLATION AND TRANSMISSION MECHANISM.
APPLICATION FILED OCT. 20, 1913.
1,156,271.
Patented Oct. 12, 1915.
2 SHEETS—SHEET 2.
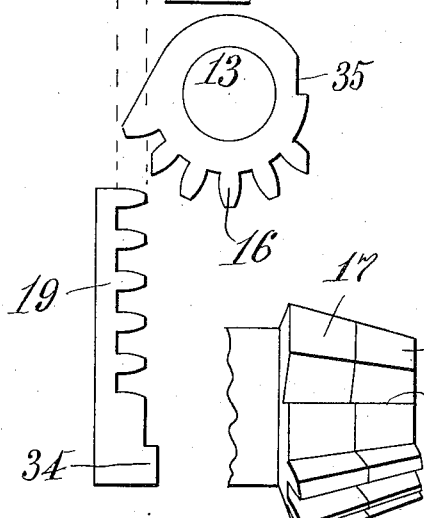
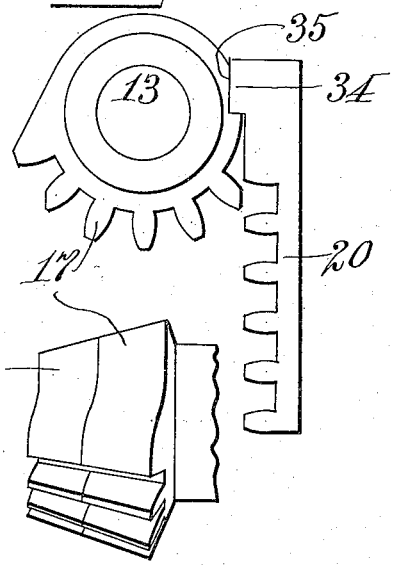

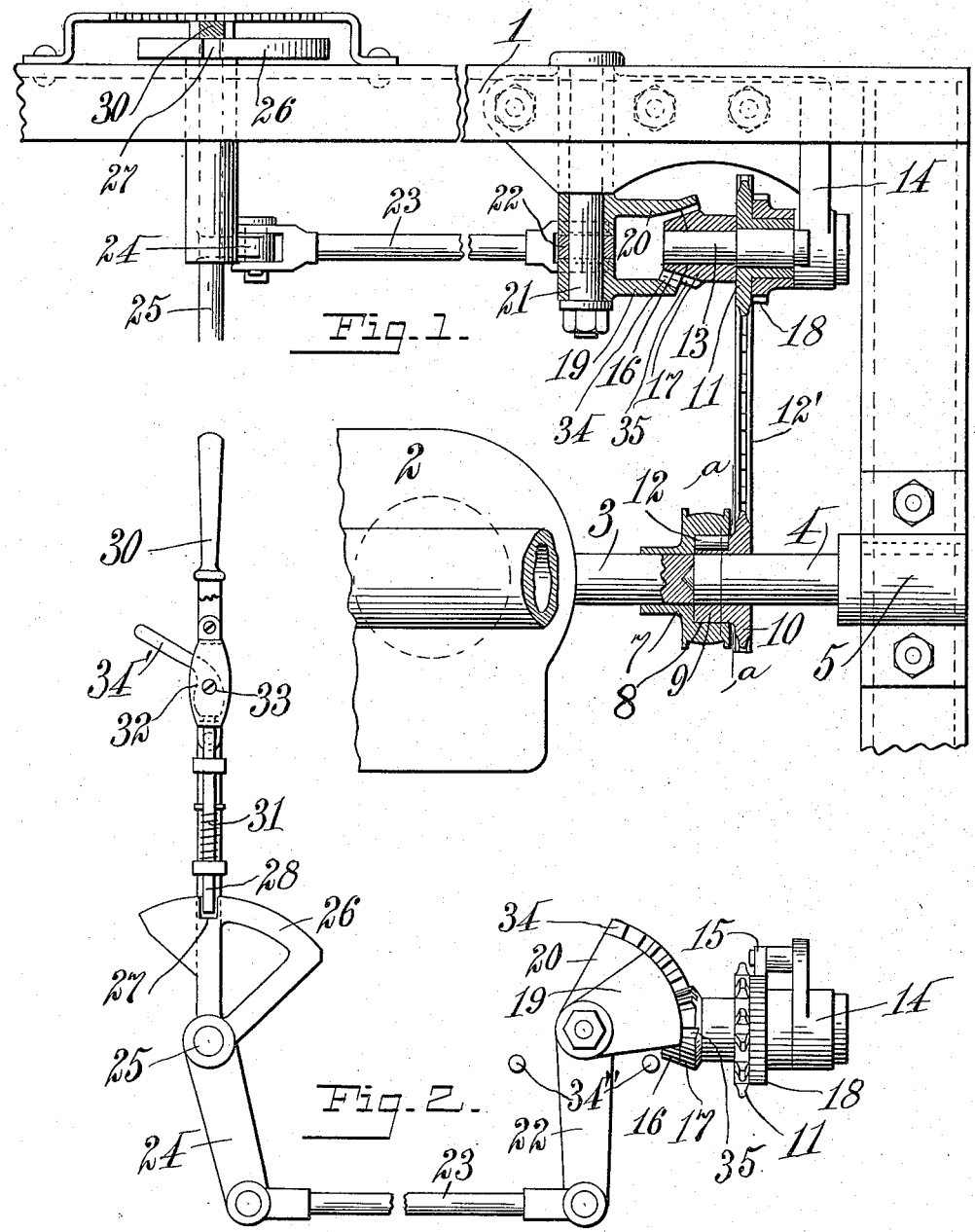

UNITED STATES PATENT OFFICE.

THOMAS CARROLL, OF DAYTON, OHIO.

MOTION TRANSLATION AND TRANSMISSION MECHANISM.

1,156,271.  Specification of Letters Patent.  Patented Oct. 12, 1915.

Application filed October 20, 1913. Serial No. 796,158.

*To all whom it may concern:*

Be it known that I, THOMAS CARROLL, a citizen of the United States, residing at Dayton, in the county of Montgomery and State of Ohio, have invented certain new and useful Improvements in Motion Translation and Transmission Mechanism; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to a type of motion translation and transmission mechanism.

In the accompanying drawings, I have shown the mechanism in connection with a motor for the starting of which it may be utilized. This, however, is only one of the uses for which my said invention is available.

The object of the invention is to provide a motion translation and transmission mechanism through which a reciprocating motion may be translated into a continuous rotary motion without disengagement of any parts through which the motion is translated and transmitted as will hereinafter more fully appear.

Referring to the accompanying drawings which illustrate my improved mechanism, Figure 1 is a top plan view, partially in section, of my improved mechanism employed for starting an engine of an explosive type; Fig. 2 is a side elevation; Figs. 3 and 4 are end elevations, partially diagrammatic, of the gears which convert the reciprocating movement of the actuating lever into rotary movement; Figs. 5 and 6 are side elevations of the actuating pinions.

In the specification and drawings, similar reference characters indicate corresponding parts.

Referring more particularly to the drawings, 1 represents a portion of the side frame of an automobile upon which is mounted, in any suitable manner, a motor 2. The motor 2 is provided with a crank shaft 3 which is connected, during the starting operation, with a shaft 4 journaled in a bearing 5 on the frame and in the end of the crank shaft 3. The shafts 3 and 4 are connected by any well known type of clutch such as the following: Rigidly secured to the crank shaft 3 is one clutch member 7 which may be a fan driving pulley provided with a circular opening which receives the other clutch member 9 secured to the shaft 4 or may be an integral part of a sprocket 10. The rollers 12 are adapted to wedge against the interior of the clutch member 7 when the starting shaft 4 is rotated clockwise, thereby driving the crank shaft 3. It will be noted that in a clutch of this type, the crank shaft 3 may run ahead of the starting shaft 4 after the engine has become started, thereby permitting the starting shaft to remain idle when not in use. The sprocket 10 is connected with a sprocket 11 by a chain 12'. The sprocket 11 is mounted on a stud 13 secured to a bracket or arm 14 extending from the frame 1. The said sprocket 11 is provided with a ratchet 18 engaged by a pawl 15 and serving to prevent retrograde movement. Also mounted on the stud 13 and secured to the sprocket 11 is a double mutilated gear pinion consisting of gear portions 16 and 17, which may be integral although shown in the drawings in two parts. The portion 16 is adapted to mesh with a segment gear 19, while the portion 17 is adapted to mesh with a segment gear 20. The segment gears 19 and 20 are mounted on a stud 21 extending from the frame 1 and are secured to a crank arm 22. The crank 22 is connected to a rod 23 which runs parallel with the side frame 1 and in turn is connected to the lower end of a crank arm 24 pivoted on a rod 25 mounted in the side frame 1. The crank arm 24 is provided with a sector 26 having a recess 27 adapted to receive the lower end of a slidable bolt 28 mounted in bearings on the lever 30 which is the brake lever. It is contemplated that the said lever 30 shall serve two purposes, to-wit, its regular function of a brake lever and for starting the engine. Owing to the engine being started when the automobile, upon which it is mounted, is standing idle, and the clutch disconnected, the operation of the lever 30 and the application of the brake will have no effect when said lever is used as the starting lever. The connection of the bolt 28 with the segment 26 takes place only during the starting operation of the engine. The bolt 28 is pressed upwardly by a spring 31 to disengage said lever and is pressed downwardly by a cam 32 pivoted at 33 and provided with a handle 34' to engage the upper end of the bolt to hold said bolt in the recess 27. When the segment 26 is actuated by the lever, the segment gears 19 and 20 will alternately engage their respective pinions 16 and 17 and will impart a continuous rotation to said pinions and to the crank shaft 3. The segment gears 19 and 20 move in unison and in order to permit one segment gear 19 or 20 to pass the pinions when said pinions are being driven by the other gear, the said pinions are provided with teeth, only on one side thereof, as shown in Figs. 3 and 4. To limit the oscillating movement of the gears 19 and 20, the said gears are provided with lugs or shoulders 34 which are adapted to engage shoulders 35 on the pinions 16 and 17 when said gears reach either end of their movement. In Fig. 2, means are shown which comprise two stops 34″ arranged on opposite sides of the crank arm 22 which serve as means to prevent or lessen the impact between the shoulders 34 and 35 of the gears. These stops may be arranged on a suitable part of the frame or in any convenient place and their distance from the crank 22 is measured by the exact throw of the gears 19 and 20.

Irrespective of the form of the gears which convert the oscillating movement into continuous or reciprocating movement, it will be seen that when the brake lever 30 is connected to the segment 26 by the bolt 28 and said brake lever is actuated, a continuous rotary movement can be imparted to the crank shaft 3 until the motor is started. At this time the said shaft will become disconnected from the starting mechanism at the clutch members 7 and 8.

While I have with some particularity described my motion translation and transmission mechanism as applied to a certain specific use, I do not desire to be restricted to such specific use nor do I desire to be confined to any unessential features or parts which may be varied or changed without overstepping the scope of the claims.

Having described my invention, I claim.

1. In a motion translation and transmission mechanism, means for translating and converting reciprocating motion into rotary motion comprising two shafts arranged in angular relation one to the other, a mutilated bevel gear having a shoulder on one side of the teeth thereof mounted on one of said shafts, and reciprocating gears mounted on the other of said shafts and arranged to alternately engage the teeth of said bevel gear, said reciprocating gears having oppositely disposed shoulders formed thereon adapted to alternately engage the shoulder on the bevel gear, whereby the reciprocatory movement of said reciprocating gears is limited at substantially each complete rotation of the bevel gear.

2. In a motion translation and transmission mechanism, the combination with two oscillatory reciprocating driving gears mounted on a common axis and having a shoulder formed on each at opposite ends thereof, of a continuously rotatable bevel gear arranged to alternately mesh with said reciprocating gears, said bevel gear having a shoulder formed on one side thereof, and the axis of which lies at a right angle to the axis of the reciprocating gears, and means for imparting reciprocatory movement to said reciprocating gears, substantially as specified.

In testimony whereof I affix my signature, in presence of two witnesses.

THOMAS CARROLL.

Witnesses:
R. J. McCarty,
Matthew Seibler.

Copies of this patent may be obtained for five cents each, by addressing the "Commissioner of Patents, Washington, D. C."